United States Patent
Liu et al.

(10) Patent No.: US 9,660,723 B2
(45) Date of Patent: May 23, 2017

(54) WAVELENGTH SELECTIVE SWITCH AND METHOD FOR CONTROLLING SPATIAL PHASE MODULATOR IN WAVELENGTHS

(71) Applicant: HUAWEI TECHNOLOGIES CO., LTD., Shenzhen (CN)

(72) Inventors: Ning Liu, Shenzhen (CN); Han Zhao, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/080,922

(22) Filed: Mar. 25, 2016

(65) Prior Publication Data

US 2016/0211912 A1 Jul. 21, 2016

Related U.S. Application Data

(63) Continuation of application No. PCT/CN2013/084468, filed on Sep. 27, 2013.

(51) Int. Cl.
*H04B 10/079* (2013.01)
*H04B 10/548* (2013.01)
(Continued)

(52) U.S. Cl.
CPC ..... *H04B 10/07957* (2013.01); *H04B 10/548* (2013.01); *H04J 14/02* (2013.01);
(Continued)

(58) Field of Classification Search
CPC . H04B 10/07957; H04B 10/548; H04J 14/02; H04Q 11/0005; H04Q 2011/0015;
(Continued)

(56) References Cited

U.S. PATENT DOCUMENTS 6,501,877 B1 * 12/2002 Weverka ............ G02B 6/29307
385/31
7,440,648 B2 10/2008 Oikawa et al.
(Continued)

FOREIGN PATENT DOCUMENTS

CN 101155162 A 4/2008
CN 102970099 A 3/2013
(Continued)

OTHER PUBLICATIONS

Evans et al., "LCOS-based WSS with true integrated channel monitor for signal quality monitoring application on ROADMs", Optical Society of America, OFC/NFOEC, IEEE, 2008, 3 pages.
(Continued)

*Primary Examiner* — Dalzid Singh
(74) *Attorney, Agent, or Firm* — Staas & Halsey LLP

(57) ABSTRACT

The present invention discloses a wavelength selective switch and a method for controlling a spatial phase modulator in a wavelength selective switch. The wavelength selective switch includes: a first demultiplexing/multiplexing component, configured to split, an input multi-wavelength optical signal into multiple single-wavelength optical signals; a spatial phase modulator, configured to change a transmission direction of each single-wavelength optical signal included in the multiple single-wavelength optical signals, where the spatial phase modulator is further configured to split a first single-wavelength optical signal in the multiple single-wavelength optical signals into a first light beam and a second light beam, where the first light beam is incident on an output port, and the second light beam is incident on a monitoring port; a photoelectric detector, configured to receive the second light beam; and a performance monitoring component, configured to perform performance monitoring on the received second light beam.

13 Claims, 5 Drawing Sheets

(51) Int. Cl.
*H04J 14/02* (2006.01)
*H04Q 11/00* (2006.01)

(52) U.S. Cl.
CPC . *H04Q 11/0005* (2013.01); *H04Q 2011/0015* (2013.01); *H04Q 2011/0016* (2013.01); *H04Q 2011/0026* (2013.01); *H04Q 2011/0028* (2013.01)

(58) Field of Classification Search
CPC ... H04Q 2011/0016; H04Q 2011/0026; H04Q 2011/0028
USPC .......................................................... 398/34
See application file for complete search history.

(56) References Cited

U.S. PATENT DOCUMENTS

| | | | | |
|---|---|---|---|---|
| 8,055,140 | B2* | 11/2011 | Vassilieva | H04B 10/2557 398/147 |
| 2006/0198583 | A1* | 9/2006 | Oikawa | H04Q 11/0005 385/53 |
| 2008/0080859 | A1 | 4/2008 | Kagawa | |
| 2009/0136233 | A1 | 5/2009 | Fukashiro | |
| 2012/0251102 | A1* | 10/2012 | Terayama | H04B 10/6932 398/25 |
| 2012/0328291 | A1* | 12/2012 | Frisken | G02B 6/356 398/48 |
| 2014/0313469 | A1* | 10/2014 | Ip | G02F 1/31 349/196 |
| 2016/0164623 | A1* | 6/2016 | Wagener | G02F 1/31 398/34 |

FOREIGN PATENT DOCUMENTS

| | | |
|---|---|---|
| CN | 103222214 A | 7/2013 |
| EP | 2 722 706 A1 | 4/2014 |
| JP | 2009-130618 | 6/2009 |
| WO | 2012/173113 A1 | 12/2012 |
| WO | WO 2015/042875 A1 | 4/2015 |

OTHER PUBLICATIONS

Schröder et al., "OSNR monitoring of a 1.28 Tbit/s signal using a reconfigurable Wavelength Selective Switch", Optical Society of America, OSA/OFC/NFOEC, 2011, 3 pages.
Schröder et al., "LCOS based waveshaper technology for optical signal processing and performance monitoring", 6E1-3, 17$^{th}$ Opto-Electronics and Communication Conference (OECC 2012) Technical Digest, Jul. 2012, Busan, Korea, pp. 859-860.
International Search Report dated Jul. 4, 2014 in corresponding International Patent Application No. PCT/CN2013/084468.
Extended European Search Report dated Aug. 9, 2016 in corresponding European Patent Application No. 13894231.3.
International Search Report mailed Jul. 4, 2014 in corresponding International Application No. PCT/CN2013/084468 (4 pages).

* cited by examiner

600

| Determine a first spatial phase sub-modulator, configured to control a first single-wavelength optical signal, of a spatial phase modulator | ~ S610 |

| Control the first spatial phase sub-modulator so that a first light beam included in the first single-wavelength optical signal is transmitted along a prime order direction of a holographic diffraction grating formed by the first spatial phase sub-modulator | ~ S620 |

| Control the first spatial phase sub-modulator so that a second light beam included in the first single-wavelength optical signal is transmitted in a non-prime order direction of the holographic diffraction grating | ~ S630 |

FIG. 7

WAVELENGTH SELECTIVE SWITCH AND METHOD FOR CONTROLLING SPATIAL PHASE MODULATOR IN WAVELENGTHS

CROSS-REFERENCE

This application is a continuation of International Application No. PCT/CN2013/084468, filed Sep. 27, 2013, which is hereby incorporated by reference in its entirety.

TECHNICAL FIELD

The present invention relates to the field of optical networks, and in particular, to a wavelength selective switch and a method for controlling a spatial phase modulator in a wavelength selective switch in the field of optical networks.

BACKGROUND

As network traffic and bandwidth rapidly increase, operators have an increasingly urgent need for an intelligent grooming function of a bottom level wavelength division network, and consequently, a reconfigurable optical add/drop multiplexer (Reconfiguration Optical Add/Drop Multiplexer, "ROADM" for short) is gradually used on networks of increasingly more operators. After the ROADM is introduced to a network, an operator can quickly provide a wavelength-level service, thereby facilitating network planning and maintenance, and reducing operating expenditures and maintenance costs.

In addition, on an optical communications network for long-distance transmission, a quantity of optical-electrical-optical (Optical Electrical Optical, "OEO" for short) conversions on a system link is decreasing, and it becomes increasingly difficult to directly test a bit error rate on an electrical layer. However, testing a bit error rate on only a terminal of a link is adverse to fault locating. As transmission capacity of an optical network increases and flexibility of the optical network improves, system complexity intensifies. To effectively control and manage the optical network, it becomes increasingly important to perform optical performance monitoring (Optical Performance Monitoring, "OPM" for short) on a high-speed dense wavelength division multiplexing (Dense Wavelength Division Multiplex, "DWDM" for short) signal on the optical network.

For example, optical power monitoring can reflect a basic channel working state and guide a system to perform automatic power equalization, optical signal to noise ratio (Optical Signal to Noise Ratio, "OSNR" for short) monitoring can relatively accurately reflect signal quality, and dispersion monitoring can reflect a channel dispersion state to guide a system to perform dispersion compensation or the like on an optical layer or an electrical layer. These parameters become important content of optical performance monitoring, and facilitate damage suppression, fault locating, degradation probe, backup and recovery, and the like of an optical network, which therefore is conducive to stable working of the optical network. Therefore, optical performance monitoring needs to be performed on all important network elements on the network, and it is also necessary to perform optical performance monitoring on the ROADM.

Currently, in a solution for performing OPM on the ROADM, an external OPM module is used outside a wavelength selective switch (Wavelength Selective Switch, "WSS" for short), an optical splitter is used to split a small part from a signal of a main optical path that is in the ROADM and that needs to be monitored, and the small part is then monitored by using the OPM module. On one hand, in the OPM module, a tunable optical filter (Tunable Optical Filter, "TOF" for short) may be used to scan an optical signal to be monitored, to perform wavelength demultiplexing on a multiplexed optical signal in a time dimension. At the same time, a channel of light is extracted from the multiplexed optical signal, so that performance monitoring is performed on this channel of single-channel optical signal. On the other hand, in the OPM module, a wavelength demultiplexer (Demultiplexer) may also be used, to perform wavelength demultiplexing on a multiplexed optical signal in a space dimension. In this way, at a same output location, only one channel of signal is extracted from the multiplexed optical signal, so that performance monitoring is performed on this channel of single-channel optical signal.

In this method, an external OPM module is used to perform performance monitoring on the ROADM, and a tunable optical filter or a wavelength demultiplexer needs to be used in the OPM module, to obtain a single-wavelength optical signal by means of splitting and monitor the single-wavelength optical signal, which significantly increases a system size and system costs.

SUMMARY

Embodiments of the present invention provide a wavelength selective switch and a method for controlling a spatial phase modulator in a wavelength selective switch, so that performance monitoring can be performed on a single-wavelength optical signal, and a system volume and system costs can be reduced.

According to a first aspect, a wavelength selective switch is provided, where the wavelength selective switch includes: a first demultiplexing/multiplexing component, configured to split a multi-wavelength optical signal into multiple single-wavelength optical signals in space, where the multi-wavelength optical signal is input from an input port of the wavelength selective switch; a spatial phase modulator, configured to separately change a transmission direction of each single-wavelength optical signal included in the multiple single-wavelength optical signals, where the spatial phase modulator is further configured to split a first single-wavelength optical signal in the multiple single-wavelength optical signals into a first light beam and a second light beam, where the first light beam is incident on an output port of the wavelength selective switch, and the second light beam is incident on a monitoring port of the wavelength selective switch; a photoelectric detector, disposed at the monitoring port and configured to receive the second light beam; and a performance monitoring component, configured to perform performance monitoring on the second light beam received by the photoelectric detector.

With reference to the first aspect, in a first possible implementation manner of the first aspect, a first spatial phase sub-modulator, configured to control the first single-wavelength optical signal, of the spatial phase modulator includes a first pixel array and a second pixel array, the first pixel array is used to control the first light beam to be incident on the output port, and the second pixel array is used to control the second light beam to be incident on the monitoring port.

With reference to the first aspect, in a second possible implementation manner of the first aspect, a first spatial phase sub-modulator, configured to control the first single-wavelength optical signal, of the spatial phase modulator forms a holographic diffraction grating, and the first spatial phase sub-modulator is configured to control the first light beam to be transmitted along a prime order direction of the holographic diffraction grating, and control the second light beam to be transmitted along a non-prime order direction of the holographic diffraction grating.

With reference to the first aspect, in a third possible implementation manner of the first aspect, strength of the first light beam is greater than strength of the second light beam.

With reference to the first aspect, in a fourth possible implementation manner of the first aspect, the spatial phase modulator is further configured to separately split, in different time dimensions, each single-wavelength optical signal included in at least two single-wavelength optical signals in the multiple single-wavelength optical signals into two light beams, where one light beam in the two light beams of each single-wavelength optical signal included in the at least two single-wavelength optical signals is incident on a same monitoring port of the wavelength selective switch at a different time point.

With reference to the first aspect, in a fifth possible implementation manner of the first aspect, the spatial phase modulator is further configured to separately split, in different space dimensions, each single-wavelength optical signal included in at least two single-wavelength optical signals in the multiple single-wavelength optical signals into two light beams, where one light beam in the two light beams of each single-wavelength optical signal included in the at least two single-wavelength optical signals is separately incident on one of at least two monitoring ports of the wavelength selective switch that are located at different locations.

With reference to the first aspect or any possible implementation manner of the first to fifth possible implementation manners of the first aspect, in a sixth possible implementation manner of the first aspect, the wavelength selective switch further includes at least one component of the following components: a first collimator, a first light beam deforming component, and a first polarization conversion component, where the multi-wavelength optical signal is incident on the first demultiplexing/multiplexing component after passing through at least one component of the first collimator, the first light beam deforming component, and the first polarization conversion component.

With reference to the first aspect or any possible implementation manner of the first to fifth possible implementation manners of the first aspect, in a seventh possible implementation manner of the first aspect, the wavelength selective switch further includes a second demultiplexing/multiplexing component, and the multiple single-wavelength optical signals whose transmission directions are changed by the spatial phase modulator are incident on at least one of the output port and the monitoring port of the wavelength selective switch after passing through the second demultiplexing/multiplexing component.

With reference to the first aspect or any possible implementation manner of the first to fifth possible implementation manners of the first aspect, in an eighth possible implementation manner of the first aspect, the wavelength selective switch further includes at least one component of the following components: a second collimator, a second light beam deforming component, and a second polarization conversion component, where the multiple single-wavelength optical signals are incident on at least one of the output port and the monitoring port of the wavelength selective switch after passing through at least one component of the second collimator, the second light beam deforming component, and the second polarization conversion component.

With reference to the first aspect or any possible implementation manner of the first to fifth possible implementation manners of the first aspect, in a ninth possible implementation manner of the first aspect, the wavelength selective switch further includes at least one component of the following components: an input-side focusing lens and an output-side focusing lens, where the multiple single-wavelength optical signals are incident on the spatial phase modulator after passing through the input-side focusing lens, or multiple single-wavelength optical signals output by the spatial phase modulator are output after being converged by the output-side focusing lens.

With reference to the first aspect or any possible implementation manner of the first to fifth possible implementation manners of the first aspect, in a tenth possible implementation manner of the first aspect, the spatial phase modulator is a liquid crystal on silicon LCOS.

According to a second aspect, a method for controlling a spatial phase modulator in a wavelength selective switch is provided, where the wavelength selective switch includes the wavelength selective switch according to the embodiments of the present invention, and the wavelength selective switch includes: a first demultiplexing/multiplexing component, configured to split a multi-wavelength optical signal into multiple single-wavelength optical signals in space, where the multi-wavelength optical signal is input from an input port of the wavelength selective switch; a spatial phase modulator, configured to separately change a transmission direction of each single-wavelength optical signal included in the multiple single-wavelength optical signals, where the spatial phase modulator is further configured to split a first single-wavelength optical signal in the multiple single-wavelength optical signals into a first light beam and a second light beam, where the first light beam is incident on an output port of the wavelength selective switch, and the second light beam is incident on a monitoring port of the wavelength selective switch; a photoelectric detector, disposed at the monitoring port and configured to receive the second light beam; and a performance monitoring component, configured to perform performance monitoring on the second light beam received by the photoelectric detector; and the method includes: determining a first pixel array and a second pixel array of the spatial phase modulator that are used to control the first single-wavelength optical signal; controlling the first pixel array so that a first light beam included in the first single-wavelength optical signal is incident on an output port of the wavelength selective switch; and controlling the second pixel array so that a second light beam included in the first single-wavelength optical signal is incident on a monitoring port of the wavelength selective switch.

According to a third aspect, a method for controlling a spatial phase modulator in a wavelength selective switch is provided, where the wavelength selective switch includes the wavelength selective switch according to the embodiments of the present invention, and the wavelength selective switch includes: a first demultiplexing/multiplexing component, configured to split a multi-wavelength optical signal into multiple single-wavelength optical signals in space, where the multi-wavelength optical signal is input from an input port of the wavelength selective switch; a spatial phase modulator, configured to separately change a transmission direction of each single-wavelength optical signal included in the multiple single-wavelength optical signals, where the spatial phase modulator is further configured to split a first single-wavelength optical signal in the multiple single-wavelength optical signals into a first light beam and a second light beam, where the first light beam is incident on an output port of the wavelength selective switch, and the second light beam is incident on a monitoring port of the wavelength selective switch; a photoelectric detector, disposed at the monitoring port and configured to receive the second light beam; and a performance monitoring component, configured to perform performance monitoring on the second light beam received by the photoelectric detector; and the method includes: determining a first spatial phase sub-modulator, configured to control the first single-wavelength optical signal, of the spatial phase modulator; controlling the first spatial phase sub-modulator so that a first light beam included in the first single-wavelength optical signal is transmitted along a prime order direction of a holographic diffraction grating formed by the first spatial phase sub-modulator; and controlling the first spatial phase sub-modulator so that a second light beam included in the first single-wavelength optical signal is transmitted along a non-prime order direction of the holographic diffraction grating.

Based on the foregoing technical solutions, in the wavelength selective switch and the method for controlling a spatial phase modulator in a wavelength selective switch in the embodiments of the present invention, a spatial phase modulator is controlled, so that a first light beam included in a single-wavelength optical signal is incident on an output port of the wavelength selective switch, and a second light beam included in the single-wavelength optical signal is incident on a monitoring port of the wavelength selective switch. In this way, performance monitoring can be performed on a single-wavelength optical signal without adding an additional tunable optical filter or wavelength demultiplexing component, and therefore, a system volume can be reduced, the complexity of a system structure can be decreased, and system costs can be significantly reduced.

BRIEF DESCRIPTION OF DRAWINGS

To describe the technical solutions in the embodiments of the present invention more clearly, the following briefly describes the accompanying drawings required for describing the embodiments of the present invention. Apparently, the accompanying drawings in the following description show merely some embodiments of the present invention, and a person of ordinary skill in the art may still derive other drawings from these accompanying drawings without creative efforts.

FIG. 7 is another schematic flowchart of a method for controlling a spatial phase modulator in a wavelength selective switch according to an embodiment of the present invention;

DESCRIPTION OF EMBODIMENTS

The following describes the technical solutions in the embodiments of the present invention with reference to the accompanying drawings in the embodiments of the present invention. Apparently, the described embodiments are a part rather than all of the embodiments of the present invention. All other embodiments obtained by a person of ordinary skill in the art based on the embodiments of the present invention without creative efforts shall fall within the protection scope of the present invention.

Figure 1:
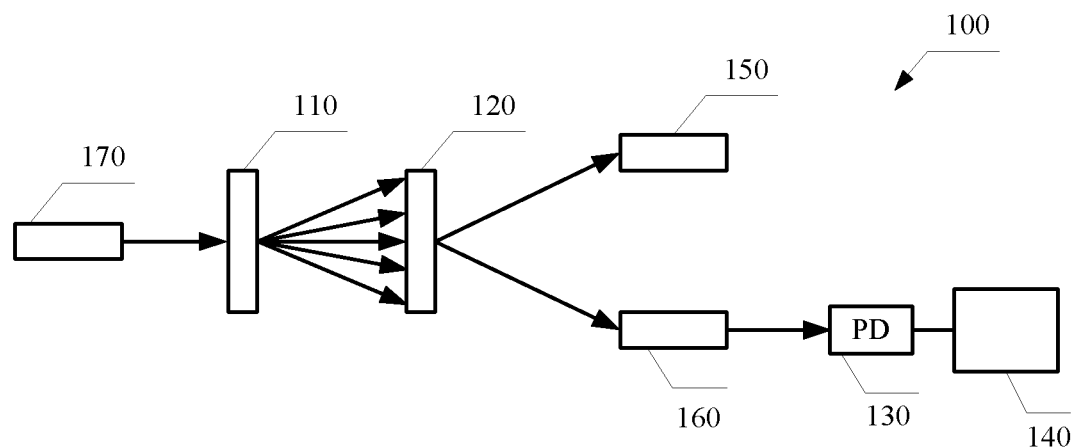
FIG. 1 is a schematic block diagram of a wavelength selective switch according to an embodiment of the present invention.

FIG. 1 shows a schematic block diagram of a wavelength selective switch 100 according to an embodiment of the present invention. As shown in FIG. 1, the wavelength selective switch 100 includes:

a first demultiplexing/multiplexing component 110, configured to split a multi-wavelength optical signal into multiple single-wavelength optical signals in space, where the multi-wavelength optical signal is input from an input port 170 of the wavelength selective switch 100;

a spatial phase modulator 120, configured to separately change a transmission direction of each single-wavelength optical signal included in the multiple single-wavelength optical signals, where the spatial phase modulator 120 is further configured to split a first single-wavelength optical signal in the multiple single-wavelength optical signals into a first light beam and a second light beam, where the first light beam is incident on an output port 150 of the wavelength selective switch 100, and the second light beam is incident on a monitoring port 160 of the wavelength selective switch 100;

a photoelectric detector 130, disposed at the monitoring port 160 and configured to receive the second light beam; and a performance monitoring component 140, configured to perform performance monitoring on the second light beam received by the photoelectric detector 130.

Specifically, for example, as shown in FIG. 1, the wavelength selective switch 100 may include the first demultiplexing/multiplexing component 110, the spatial phase modulator 120, the photoelectric detector 130, and the performance monitoring component 140. In addition, the wavelength selective switch 100 may further include the input port 170, the output port 150, and the monitoring port 160, where an input signal may enter the wavelength selective switch 100 from the input port 170, some optical signals may be output at the output port 150, to implement selection of a single-wavelength optical signal, and other optical signals may be output at the monitoring port 160, so that some or all wavelength optical signals output by the wavelength selective switch 100 are monitored.

In this embodiment of the present invention, the first demultiplexing/multiplexing component 110 is, for example, an optical grating component. After a multi-wavelength optical signal that is input through the input port 170 and that has multiple wavelengths, for example, a multi-wavelength optical signal having two or more wavelengths, passes through the first demultiplexing/multiplexing component 110, multiple single-wavelength optical signals that are separated in space and that have single wavelengths may be formed. After the single-wavelength optical signals are modulated by the spatial phase modulator 120, for example, after an angle of reflection or an angle of refraction of each single-wavelength optical signal included in the multiple single-wavelength optical signals is separately changed, transmission directions of the multiple single-wavelength optical signals are changed, so that each single-wavelength optical signal can be output to a desired location, and especially, one single-wavelength optical signal can be output to at least two different fixed locations that are desired, that is, the spatial phase modulator can separately control each optical signal part included in each single-wavelength optical signal, so that each optical signal part is output to a desired location.

For example, for a first single-wavelength optical signal in the multiple single-wavelength optical signals, the spatial phase modulator 120 is further configured to split, in space, the first single-wavelength optical signal into a first light beam and a second light beam, where the first light beam is incident on the output port 150, and the second light beam is incident on the monitoring port 160. In this way, the photoelectric detector 130 disposed on the monitoring port 160 can detect the second light beam, and the performance monitoring component 140 performs performance monitoring on the second light beam, so that performance monitoring is performed on the first single-wavelength optical signal.

Therefore, in the wavelength selective switch in this embodiment of the present invention, the spatial phase modulator is controlled, so that the first light beam included in the single-wavelength optical signal is incident on the output port of the wavelength selective switch, and the second light beam included in the single-wavelength optical signal is incident on the monitoring port of the wavelength selective switch. In this way, performance monitoring can be performed on a single-wavelength optical signal without adding an additional tunable optical filter or wavelength demultiplexing component, and therefore, a system volume can be reduced, the complexity of a system structure can be decreased, and system costs can be significantly reduced.

It should be understood that in this embodiment of the present invention, the first single-wavelength optical signal may be any single-wavelength optical signal in the multiple single-wavelength optical signals, and it should be further understood that the single-wavelength optical signal may be an optical signal having a single center wavelength, and this embodiment of the present invention is not limited thereto. For example, in this embodiment of the present invention, the first single-wavelength optical signal may further include multiple single-wavelength optical signals, and for each single-wavelength signal, the spatial phase modulator can split the single-wavelength optical signal into a first light beam and a second light beam, where the first light beam is incident on the output port of the wavelength selective switch, and the second light beam is incident on the monitoring port of the wavelength selective switch.

It should be further understood that in this embodiment of the present invention, the photoelectric detector may be a component that converts a received optical signal into an electrical signal, for example, the photoelectric detector 130 may be a photodiode, a PIN photodiode, an avalanche photodiode, or the like, and this embodiment of the present invention is not limited thereto.

It should be further understood that in this embodiment of the present invention, the performance monitoring component 140, for example, may monitor optical power of an optical signal, or may monitor an optical signal to noise ratio OSNR of an optical signal, or may monitor dispersion or the like of an optical signal, and this embodiment of the present invention is not limited thereto.

It should be further understood that in this embodiment of the present invention, to facilitate better monitoring on an optical signal, before the second light beam is incident on the photoelectric detector, the second light beam may be further incident on another optical component, for example, the second light beam may be split by an optical splitter, may be converged by a focusing lens, or the like, and this embodiment of the present invention is not limited thereto. In addition, in this embodiment of the present invention, it may be further understood that the photoelectric detector and the performance monitoring component may be separately disposed independently, or may be disposed integrally as a performance monitoring module, and this embodiment of the present invention is not limited thereto.

In this embodiment of the present invention, the spatial phase modulator may be a switching engine that uses multiple pixels, where each pixel may be separately controlled. Specifically, for example, pixels may form a phase grating when values of voltages loaded to the pixels are changed, and each pixel may have a different gray level value. In this way, the formed phase grating can generate different diffraction effects, or optical signals passing through the phase grating have different deflection directions.

Optionally, in this embodiment of the present invention, the spatial phase modulator is a liquid crystal on silicon (Liquid Crystal On Silicon, "LCOS" for short). It should be understood that in this embodiment of the present invention, the LCOS is used as an example only for the descriptive purpose, but this embodiment of the present invention is not limited thereto, and the spatial phase modulator may also be another component that can implement the foregoing functions.

In this embodiment of the present invention, optionally, a first spatial phase sub-modulator, configured to control the first single-wavelength optical signal, of the spatial phase modulator 120 includes a first pixel array and a second pixel array, the first pixel array is used to control the first light beam to be incident on the output port 150, and the second pixel array is used to control the second light beam to be incident on the monitoring port 160.

It should be understood that the spatial phase modulator may include multiple spatial phase sub-modulators, configured to separately control different single-wavelength optical signals, where each spatial phase sub-modulator may include a pixel array formed by multiple pixels, for example, the first spatial phase sub-modulator may include the first pixel array and the second pixel array.

That the spatial phase modulator 120 is an LCOS is used as an example for description. The LCOS may be formed by multiple pixels, voltages of different values are loaded to different pixels, and a phase of each pixel can be controlled independently, so that a phase grating formed by the pixels can control a deflection angle of an optical signal. In general, each single-wavelength optical signal is controlled by thousands of pixels, but in theory, a grating formed by around 100 pixels can effectively control a deflection angle of a light ray.

Figure 2:
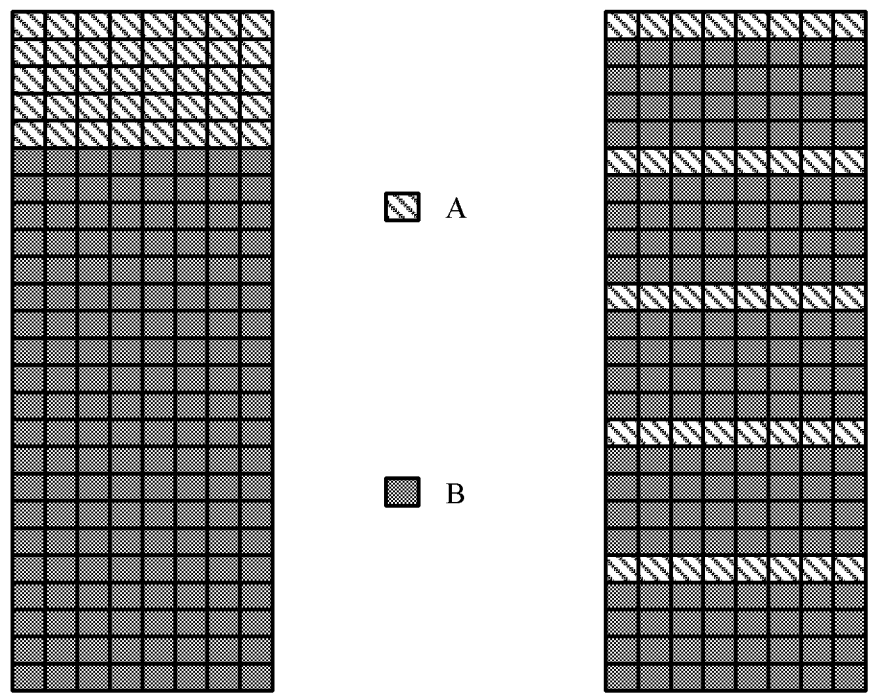
FIG. 2 is a schematic block diagram of a spatial phase modulator according to an embodiment of the present invention.

Therefore, thousands of pixels controlling a single single-wavelength optical signal may be grouped into two parts. For example, as shown in FIG. 2, the pixels may be grouped into the first pixel array formed by type-A pixels and the second pixel array formed by type-B pixels. Some pixels such as the type-B pixels are used to control the first light beam included in the single-wavelength optical signal, so that the first light beam is incident on the output port of the wavelength selective switch, and other pixels such as the type-A pixels may be used to control the second light beam included in the single-wavelength optical signal, so that the second light beam is incident on the monitoring port of the wavelength selective switch, to be used for optical performance monitoring.

In this embodiment of the present invention, with more pixels, a formed phase grating has higher diffraction efficiency, and crosstalk between channels is smaller. For optical performance monitoring OPM, low isolation is required; therefore, a small quantity of pixels may be used to control a small part of a single-wavelength optical signal to be used for OPM. That is, in this embodiment of the present invention, optionally, strength of the first light beam is greater than strength of the second light beam, so that a small part of the single-wavelength optical signal is used for OPM, and most of the single-wavelength optical signal is output at the output port of the WSS, which can reduce system insertion loss.

It should be understood that in this embodiment of the present invention, the second pixel array included in the first spatial phase sub-modulator, for example, the type-A pixels shown in FIG. 2, may be a continuous area in the first spatial phase sub-modulator, as shown in the left figure in FIG. 2, or may be discontinuous areas in the first spatial phase sub-modulator, as shown in the right figure in FIG. 2, where the first pixel array and the second pixel array are arranged in an interleaved manner.

It should be further understood that in this embodiment of the present invention, the first spatial phase sub-modulator configured to control the first single-wavelength optical signal may be a continuous area or discontinuous areas in the spatial phase modulator configured to control each single-wavelength optical signal. For example, the first spatial phase sub-modulator and a part, configured to control another single-wavelength optical signal, of the spatial phase modulator may be arranged in an interleaved manner, but this embodiment of the present invention is not limited thereto.

It should be further understood that in this embodiment of the present invention, by controlling a phase of each pixel, the LCOS for OPM can output, to the monitoring port, an optical signal that needs to be monitored, and may scatter, to a place without an optical fiber, light that does not need to be monitored. Because an LCOS for OPM and an LCOS for the WSS may be separately controlled independently, an added OPM function does not affect function implementation of the WSS.

Figure 3:
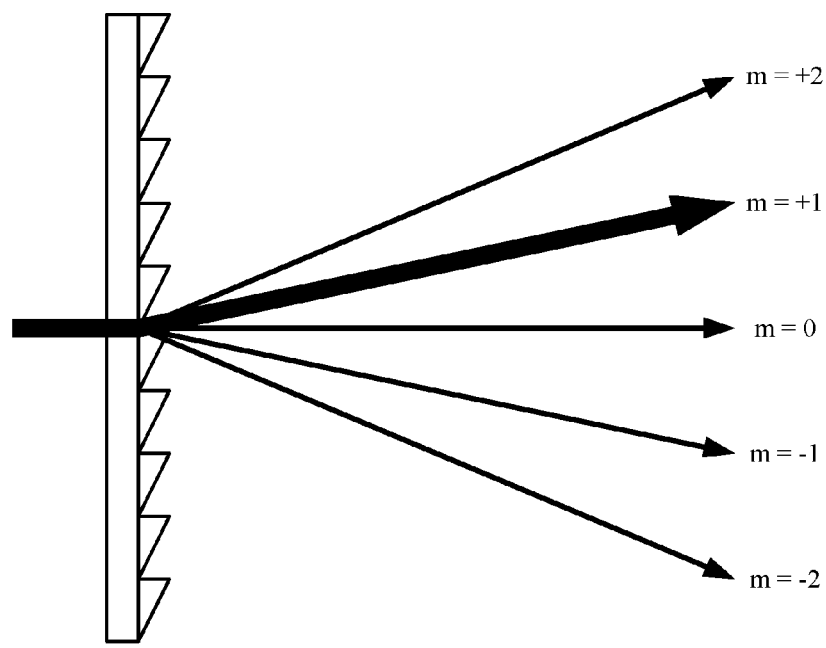
FIG. 3 is another schematic block diagram of a spatial phase modulator according to an embodiment of the present invention.

In the spatial phase modulator such as a liquid crystal on silicon LCOS in the foregoing embodiment, by means of a phase modulation feature of the spatial phase modulator, a phase grating may be formed by loading voltages of different values to different pixels, and multiple diffractive orders are generated after incident light passes through the phase grating that serves as a diffraction grating. After a single-wavelength optical signal passes through the first pixel array of the first spatial phase sub-modulator, only an optical signal transmitted along a first-order diffractive order, also referred to as an optical signal transmitted along a prime order direction, for example, as shown in FIG. 3, an optical signal transmitted along an m=+1 direction, is input to an output port of the WSS; and after a single-wavelength optical signal passes through the second pixel array of the first spatial phase sub-modulator, only an optical signal transmitted along a prime order direction is input to a monitoring port of the WSS. An optical signal of another non-prime order, for example, as shown in FIG. 3, an optical signal transmitted along an m=+2, m=0, m=−1, or m=−2 direction is scattered and attenuated after being transmitted to a location without an output optical fiber, and optical signals of some non-prime orders even enter another output port or monitoring port and become crosstalk signals.

To fully use diffraction energy of non-prime orders and avoid possible crosstalk, a gray level value of each pixel may be precisely designed so that a holographic diffraction grating is formed on the LCOS, and deflection directions of diffracted light of non-prime orders is effectively controlled so that diffracted light of most non-prime orders is output at a fixed monitoring port, to be used for OPM.

Optionally, in this embodiment of the present invention, a first spatial phase sub-modulator, configured to control the first single-wavelength optical signal, of the spatial phase modulator 120 forms a holographic diffraction grating, where the first spatial phase sub-modulator is configured to control the first light beam to be transmitted along a prime order direction of the holographic diffraction grating, and control the second light beam to be transmitted along a non-prime order direction of the holographic diffraction grating.

Specifically, when performance monitoring needs to be performed on a single-wavelength optical signal, for example, when the first single-wavelength optical signal needs to be detected, the first spatial phase sub-modulator controlling the first single-wavelength optical signal may be controlled according to a pre-designed gray level value of each pixel, so that the first light beam transmitted along the prime order direction of the holographic diffraction grating formed by the first spatial phase sub-modulator is incident on an output port of the wavelength selective switch, and the second light beam transmitted along most non-prime order directions of the holographic diffraction grating is incident on a monitoring port of the wavelength selective switch.

When performance monitoring does not need to be performed on the single-wavelength optical signal, the first spatial phase sub-modulator may be controlled according to a pre-designed gray level value of each pixel, so that beams transmitted along most other non-prime order directions are incident on a location without an output optical fiber and are scattered.

Diffracted light of other non-prime orders that would be otherwise scattered and wasted is fully used in the foregoing method, which therefore not only can further reduce system insertion loss, but also can avoid possible crosstalk and improve a system anti-interference capability.

It should be understood that the spatial phase modulator controlling multiple single-wavelength optical signals may be controlled according to a pre-designed gray level value of each pixel, so that optical signals separately transmitted along most non-prime order directions of holographic diffraction gratings formed by spatial phase modulators such as the first spatial phase sub-modulator and a second spatial phase sub-modulator for controlling a second single-wavelength optical signal may be incident on a fixed monitoring port of the wavelength selective switch. That is, the spatial phase modulator may be designed such that when an output location of diffracted light of a prime order changes, an output location of diffracted light of most other non-prime orders may not change.

Therefore, in the wavelength selective switch in this embodiment of the present invention, the spatial phase modulator is controlled, so that the first light beam included in the single-wavelength optical signal is incident on the output port of the wavelength selective switch, and the second light beam included in the single-wavelength optical signal is incident on the monitoring port of the wavelength selective switch. In this way, performance monitoring can be performed on a single-wavelength optical signal without adding an additional tunable optical filter or wavelength demultiplexing component, and therefore, a system volume and insertion loss can be reduced, the complexity of a system structure can be decreased, system costs can be significantly reduced, and a system anti-interference capability can be improved.

Control performed by the spatial phase modulator on a transmission direction of a single single-wavelength optical signal is described above from the perspective of a single single-wavelength optical signal, and control performed by the spatial phase modulator on transmission directions of multiple single-wavelength optical signals is described below from the perspective of multiple single-wavelength optical signals.

In this embodiment of the present invention, optionally, the spatial phase modulator 120 is further configured to separately split, in different time dimensions, each single-wavelength optical signal included in at least two single-wavelength optical signals in the multiple single-wavelength optical signals into two light beams, where one light beam in the two light beams of each single-wavelength optical signal included in the at least two single-wavelength optical signals is incident on a same monitoring port 160 of the wavelength selective switch at a different time point.

Figure 4:
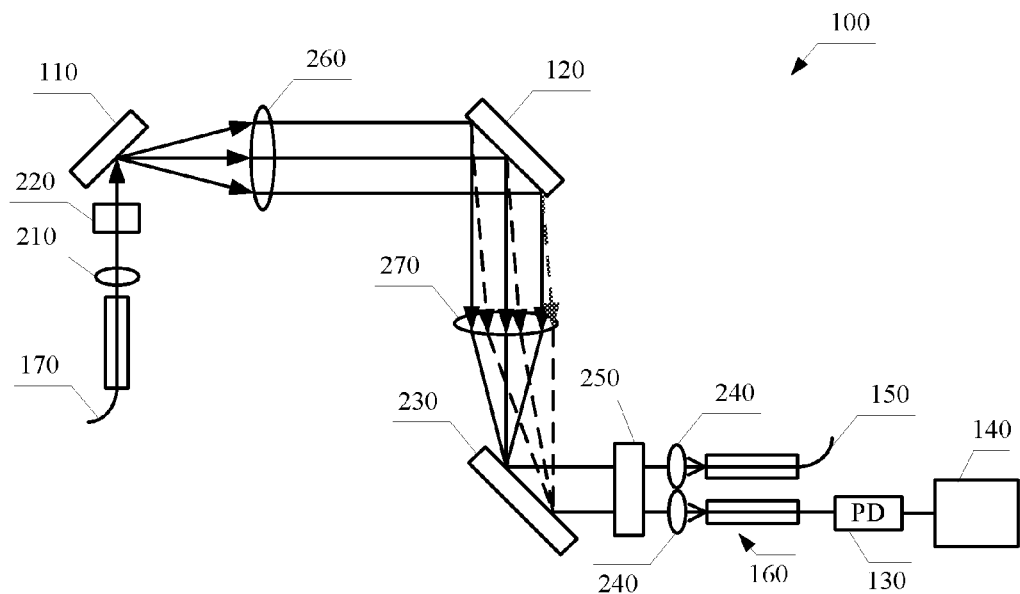
FIG. 4 is another schematic block diagram of a wavelength selective switch according to an embodiment of the present invention.

For example, as shown in FIG. 4, the first spatial phase sub-modulator, configured to control the first single-wavelength optical signal, of the spatial phase modulator 120 may control the first light beam included in the first single-wavelength optical signal to be input to a monitoring port 160 of the wavelength selective switch 100 at a first time point, and the second spatial phase sub-modulator, configured to control the second single-wavelength optical signal, of the spatial phase modulator 120 may control a first light beam included in the second single-wavelength optical signal to be input to a fixed monitoring port 160 of the wavelength selective switch 100 at a second time point. In this way, single-wavelength optical signals that need to be monitored may be output, according to a monitoring requirement and in different time dimensions, to a fixed monitoring port for optical performance monitoring. That is, single-wavelength optical signals of different wavelengths may be incident on a same monitoring port at different time points, to perform optical performance monitoring on different single-wavelength optical signals.

It should be understood that in this embodiment of the present invention, the first spatial phase sub-modulator may control one light beam of each single-wavelength optical signal included in the at least two single-wavelength optical signals to be incident on one monitoring port 160 of the wavelength selective switch at a different time point, and the first spatial phase sub-modulator may further control the other light beam of each single-wavelength optical signal included in the at least two single-wavelength optical signals to be incident on at least one output port 150 of the wavelength selective switch at a different time point, or to be separately incident on one of at least two output ports 150 of the wavelength selective switch that are located at different locations, and this embodiment of the present invention is not limited thereto.

In this embodiment of the present invention, optionally, the spatial phase modulator 120 is further configured to separately split, in different space dimensions, each single-wavelength optical signal included in at least two single-wavelength optical signals in the multiple single-wavelength optical signals into two light beams, where one light beam in the two light beams of each single-wavelength optical signal included in the at least two single-wavelength optical signals is separately incident on one of at least two monitoring ports 160 of the wavelength selective switch that are located at different locations.

Figure 5:
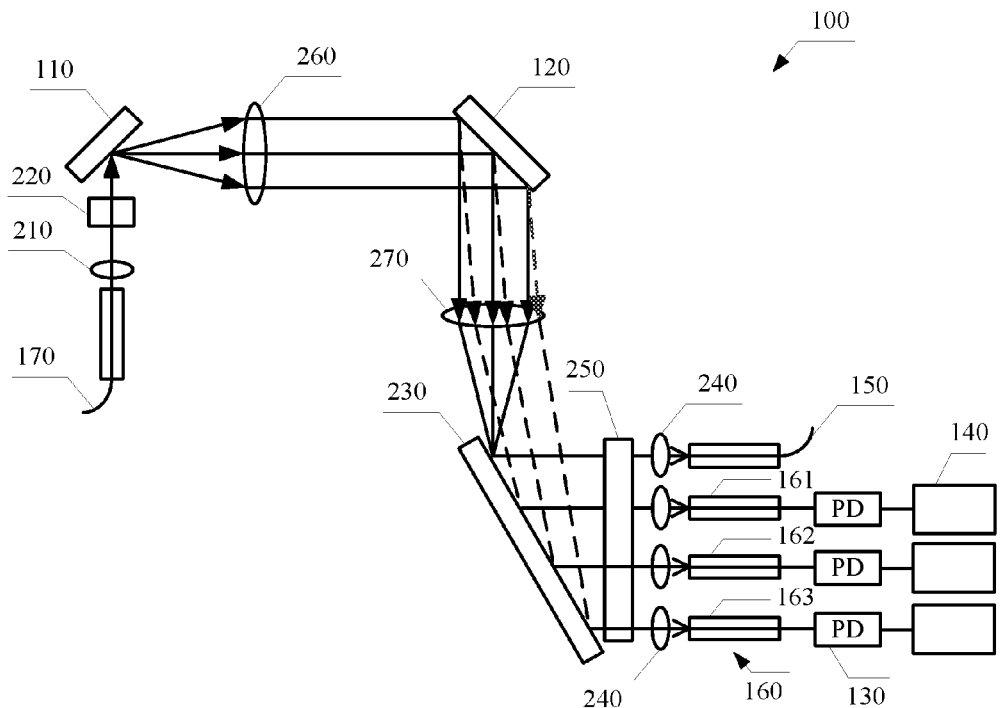
FIG. 5 is still another schematic block diagram of a wavelength selective switch according to an embodiment of the present invention.

For example, as shown in FIG. 5, the first spatial phase sub-modulator, configured to control the first single-wavelength optical signal, of the spatial phase modulator 120 may control the first light beam included in the first single-wavelength optical signal to be input to a fixed monitoring port 161 of the wavelength selective switch 100; the second spatial phase sub-modulator, configured to control the second single-wavelength optical signal, of the spatial phase modulator 120 may control a first light beam included in the second single-wavelength optical signal to be input to another fixed monitoring port 162 of the wavelength selective switch 100; and a third spatial phase sub-modulator, configured to control a third single-wavelength optical signal, of the spatial phase modulator 120 may control a first light beam included in the third single-wavelength optical signal to be input to still another fixed monitoring port 163 of the wavelength selective switch 100. In this way, in different space dimensions, single-wavelength optical signals in multiple single-wavelength optical signals are separately output to multiple different locations, so that optical performance monitoring can be separately performed on the single-wavelength optical signals simultaneously.

It should be understood that in this embodiment of the present invention, for two light beams that are obtained by the spatial phase modulator 120 by splitting, in different space dimensions, each of the single-wavelength optical signals, one light beam may be separately incident on one of at least two monitoring ports 160 of the wavelength selective switch that are located at different locations; and the other light beam may be incident on at least one output port 150 of the wavelength selective switch at a different time point, or may be separately incident on one of at least two output ports 150 of the wavelength selective switch that are located at different locations, and this embodiment of the present invention is not limited thereto.

Therefore, in the wavelength selective switch in this embodiment of the present invention, the spatial phase modulator is controlled, so that the first light beam included in the single-wavelength optical signal is incident on the output port of the wavelength selective switch, and the second light beam included in the single-wavelength optical signal is incident on the monitoring port of the wavelength selective switch. In this way, performance monitoring can be performed on a single-wavelength optical signal without adding an additional tunable optical filter or wavelength demultiplexing component, and therefore, a system volume and insertion loss can be reduced, the complexity of a system structure can be decreased, system costs can be significantly reduced, and a system anti-interference capability can be improved.

In this embodiment of the present invention, optionally, the wavelength selective switch 100 further includes at least one component of the following components: a first collimator 210, a first light beam deforming component, and a first polarization conversion component 220, where the multi-wavelength optical signal is incident on the first demultiplexing/multiplexing component 110 after passing through at least one component of the first collimator 210, the first light beam deforming component, and the first polarization conversion component 220.

For example, as shown in FIG. 4 or FIG. 5, a multi-wavelength optical signal may enter an input fiber array from the input port 170 of the wavelength selective switch 100; the first collimator 210 may collimate the multi-wavelength optical signal; and the collimated multi-wavelength optical signal may be directly incident on the first demultiplexing/multiplexing component 110, or may be first incident on the first light beam deforming component and/or the first polarization conversion component 220, and is then incident on the first demultiplexing/multiplexing component 110 after a shape and/or a polarization state of the incident multi-wavelength optical signal is adjusted by the first light beam deforming component and/or the first polarization conversion component 220.

The incident multi-wavelength optical signal may be split into multiple single-wavelength optical signals in space after being demultiplexed by the first demultiplexing/multiplexing component 110; and the multiple single-wavelength optical signals may be indirectly incident on the spatial phase modulator 120, or may be incident on the spatial phase modulator 120 after passing through an input-side focusing lens 260, as shown in FIG. 4 or FIG. 5. After the spatial phase modulator 120 separately changes a transmission direction of each single-wavelength optical signal included in the multiple single-wavelength optical signals, each single-wavelength optical signal may be directly incident on the output port 150 or the monitoring port 160 of the wavelength selective switch 100, or may be output after being converged by an output-side focusing lens 270, for example, as shown in FIG. 4 or FIG. 5.

That is, optionally, in this embodiment of the present invention, the wavelength selective switch 100 further includes at least one component of the following components: an input-side focusing lens 260 and an output-side focusing lens 270, where the multiple single-wavelength optical signals are incident on the spatial phase modulator 120 after passing through the input-side focusing lens 260, or multiple single-wavelength optical signals output by the spatial phase modulator 120 are output after being converged by the output-side focusing lens 270.

In this embodiment of the present invention, optionally, as shown in FIG. 4 or FIG. 5, the wavelength selective switch 100 further includes a second demultiplexing/multiplexing component 230, and the multiple single-wavelength optical signals whose transmission directions are changed by the spatial phase modulator 120 are incident on at least one of the output port 150 and the monitoring port 160 of the wavelength selective switch 100 after passing through the second demultiplexing/multiplexing component 230.

Optionally, as shown in FIG. 4 or FIG. 5, the wavelength selective switch 100 further includes at least one component of the following components: a second collimator 240, a second light beam deforming component, and a second polarization conversion component 250, where the multiple single-wavelength optical signals are incident on at least one of the output port 150 and the monitoring port 160 of the wavelength selective switch 100 after passing through at least one component of the second collimator 240, the second light beam deforming component, and the second polarization conversion component 250.

That is, in this embodiment of the present invention, each single-wavelength optical signal whose transmission direction is changed by the spatial phase modulator may be incident on the output port 150 and/or the monitoring port 160 of the wavelength selective switch 100 after being multiplexed by the second demultiplexing/multiplexing component 230. That is, the monitoring port 160 of the wavelength selective switch 100 may perform optical performance monitoring on a single-wavelength optical signal, or may perform optical performance monitoring on a multi-wavelength optical signal formed by multiple single-wavelength optical signals, and this embodiment of the present invention is not limited thereto.

In addition, in this embodiment of the present invention, multiple single-wavelength optical signals or multiple multi-wavelength optical signals may be incident on the output port 150 and/or the monitoring port 160 of the wavelength selective switch 100 after being collimated by the second collimator 240, and/or after shapes and polarization states of the multiple single-wavelength optical signals or multiple multi-wavelength optical signals are adjusted by the second light beam deforming component and the second polarization conversion component 250.

It should be understood that in this embodiment of the present invention, a collimator may be configured to collimate an input optical signal, and the collimator is, for example, a group of lens groups; a light beam deforming component and a polarization conversion component may be separately configured to change a shape and a polarization state of an input optical signal, and the light beam deforming component or the polarization conversion component may also be formed by one or more groups of lenses; and a focusing lens may be configured to converge or focus an input optical signal, where the focusing lens may be a single lens, or may be a group of lenses, and this embodiment of the present invention is not limited thereto.

Therefore, in the wavelength selective switch in this embodiment of the present invention, a spatial phase modulator is controlled, so that a first light beam included in a single-wavelength optical signal is incident on an output port of the wavelength selective switch, and a second light beam included in the single-wavelength optical signal is incident on a monitoring port of the wavelength selective switch. In this way, performance monitoring can be performed on a single-wavelength optical signal without adding an additional tunable optical filter or wavelength demultiplexing component, and therefore, a system volume and insertion loss can be reduced, the complexity of a system structure can be decreased, system costs can be significantly reduced, and a system anti-interference capability can be improved.

The wavelength selective switch according to the embodiments of the present invention is described in detail above with reference to FIG. 1 to FIG. 5, and a method and an apparatus for controlling a spatial phase modulator in a wavelength selective switch according to embodiments of the present invention are described in detail below with reference to FIG. 6 to FIG. 9.

Figure 6:
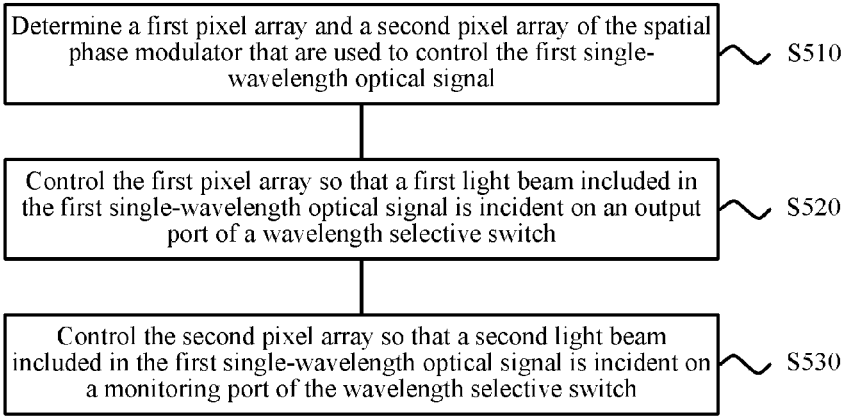
FIG. 6 is a schematic flowchart of a method for controlling a spatial phase modulator in a wavelength selective switch according to an embodiment of the present invention.

FIG. 6 shows a method 500 for controlling a spatial phase modulator in a wavelength selective switch according to an embodiment of the present invention. The wavelength selective switch includes: a first demultiplexing/multiplexing component, configured to split a multi-wavelength optical signal into multiple single-wavelength optical signals in space, where the multi-wavelength optical signal is input from an input port of the wavelength selective switch; a spatial phase modulator, configured to separately change a transmission direction of each single-wavelength optical signal included in the multiple single-wavelength optical signals, where the spatial phase modulator is further configured to split a first single-wavelength optical signal in the multiple single-wavelength optical signals into a first light beam and a second light beam, where the first light beam is incident on an output port of the wavelength selective switch, and the second light beam is incident on a monitoring port of the wavelength selective switch; a photoelectric detector, disposed at the monitoring port and configured to receive the second light beam; and a performance monitoring component, configured to perform performance monitoring on the second light beam received by the photoelectric detector.

As shown in FIG. 6, the method 500 includes:

S510. Determine a first pixel array and a second pixel array of the spatial phase modulator that are used to control the first single-wavelength optical signal.

S520. Control the first pixel array so that the first light beam included in the first single-wavelength optical signal is incident on the output port of the wavelength selective switch.

S530. Control the second pixel array so that the second light beam included in the first single-wavelength optical signal is incident on the monitoring port of the wavelength selective switch.

Therefore, in the method for controlling a spatial phase modulator in a wavelength selective switch in this embodiment of the present invention, the spatial phase modulator is controlled, so that the first light beam included in the single-wavelength optical signal is incident on the output port of the wavelength selective switch, and the second light beam included in the single-wavelength optical signal is incident on the monitoring port of the wavelength selective switch. In this way, performance monitoring can be performed on a single-wavelength optical signal without adding an additional tunable optical filter or wavelength demultiplexing component, and therefore, a system volume can be reduced, the complexity of a system structure can be decreased, and system costs can be significantly reduced.

In this embodiment of the present invention, optionally, a first spatial phase sub-modulator, configured to control the first single-wavelength optical signal, of the spatial phase modulator includes a first pixel array and a second pixel array, the first pixel array is used to control the first light beam to be incident on the output port, and the second pixel array is used to control the second light beam to be incident on the monitoring port.

In this embodiment of the present invention, optionally, a first spatial phase sub-modulator, configured to control the first single-wavelength optical signal, of the spatial phase modulator forms a holographic diffraction grating, and the first spatial phase sub-modulator is configured to control the first light beam to be transmitted along a prime order direction of the holographic diffraction grating, and control the second light beam to be transmitted along a non-prime order direction of the holographic diffraction grating.

In this embodiment of the present invention, optionally, strength of the first light beam is greater than strength of the second light beam.

In this embodiment of the present invention, optionally, the spatial phase modulator is further configured to separately split, in different time dimensions, each single-wavelength optical signal included in at least two single-wavelength optical signals in the multiple single-wavelength optical signals into two light beams, and one light beam in the two light beams of each single-wavelength optical signal included in the at least two single-wavelength optical signals is incident on a same monitoring port of the wavelength selective switch at a different time point.

In this embodiment of the present invention, optionally, the spatial phase modulator is further configured to separately split, in different space dimensions, each single-wavelength optical signal included in at least two single-wavelength optical signals in the multiple single-wavelength optical signals into two light beams, and one light beam in the two light beams of each single-wavelength optical signal included in the at least two single-wavelength optical signals is separately incident on one of at least two monitoring ports of the wavelength selective switch that are located at different locations.

In this embodiment of the present invention, optionally, the wavelength selective switch further includes at least one component of the following components: a first collimator, a first light beam deforming component, and a first polarization conversion component, where the multi-wavelength optical signal is incident on the first demultiplexing/multiplexing component after passing through at least one component of the first collimator, the first light beam deforming component, and the first polarization conversion component.

In this embodiment of the present invention, optionally, the wavelength selective switch further includes a second demultiplexing/multiplexing component, and the multiple single-wavelength optical signals whose transmission directions are changed by the spatial phase modulator are incident on at least one of the output port and the monitoring port of the wavelength selective switch after passing through the second demultiplexing/multiplexing component.

In this embodiment of the present invention, optionally, the wavelength selective switch further includes at least one component of the following components: a second collimator, a second light beam deforming component, and a second polarization conversion component, where the multiple single-wavelength optical signals are incident on at least one of the output port and the monitoring port of the wavelength selective switch after passing through at least one component of the second collimator, the second light beam deforming component, and the second polarization conversion component.

In this embodiment of the present invention, optionally, the wavelength selective switch further includes at least one component of the following components: an input-side focusing lens and an output-side focusing lens, where the multiple single-wavelength optical signals are incident on the spatial phase modulator after passing through the input-side focusing lens, or multiple single-wavelength optical signals output by the spatial phase modulator are output after being converged by the output-side focusing lens.

In this embodiment of the present invention, optionally, the spatial phase modulator is a liquid crystal on silicon LCOS.

It should be understood that in the embodiments of the present invention, the sequence numbers of all the foregoing processes do not indicate an execution sequence, and execution sequences of all processes should be determined by functions and internal logic of the processes; therefore, an implementation process of the embodiments of the present invention is not limited thereto.

It should be further understood that the wavelength selective switch according to this embodiment of the present invention may correspond to the wavelength selective switch 100 in the foregoing embodiment of the present invention, and the foregoing and other operations and/or functions of the modules in the wavelength selective switch 100 may be shown in FIG. 1 to FIG. 5. For the purpose of conciseness, details are not described herein again.

Therefore, in the method for controlling a spatial phase modulator in a wavelength selective switch in this embodiment of the present invention, a spatial phase modulator is controlled, so that a first light beam included in a single-wavelength optical signal is incident on an output port of the wavelength selective switch, and a second light beam included in the single-wavelength optical signal is incident on a monitoring port of the wavelength selective switch. In this way, performance monitoring can be performed on a single-wavelength optical signal without adding an additional tunable optical filter or wavelength demultiplexing component, and therefore, a system volume can be reduced, the complexity of a system structure can be decreased, and system costs can be significantly reduced.

FIG. 7 further shows another method 600 for controlling a spatial phase modulator in a wavelength selective switch according to an embodiment of the present invention. The wavelength selective switch includes: a first demultiplexing/multiplexing component, configured to split a multi-wavelength optical signal into multiple single-wavelength optical signals in space, where the multi-wavelength optical signal is input from an input port of the wavelength selective switch; a spatial phase modulator, configured to separately change a transmission direction of each single-wavelength optical signal included in the multiple single-wavelength optical signals, where the spatial phase modulator is further configured to split a first single-wavelength optical signal in the multiple single-wavelength optical signals into a first light beam and a second light beam, where the first light beam is incident on an output port of the wavelength selective switch, and the second light beam is incident on a monitoring port of the wavelength selective switch; a photoelectric detector, disposed at the monitoring port and configured to receive the second light beam; and a performance monitoring component, configured to perform performance monitoring on the second light beam received by the photoelectric detector.

As shown in FIG. 7, the method 600 includes:

S610. Determine a first spatial phase sub-modulator, configured to control the first single-wavelength optical signal, of the spatial phase modulator.

S620. Control the first spatial phase sub-modulator so that the first light beam included in the first single-wavelength optical signal is transmitted along a prime order direction of a holographic diffraction grating formed by the first spatial phase sub-modulator.

S630. Control the first spatial phase sub-modulator so that the second light beam included in the first single-wavelength optical signal is transmitted along a non-prime order direction of the holographic diffraction grating.

It should be understood that in the embodiments of the present invention, the sequence numbers of all the foregoing processes do not indicate an execution sequence, and execution sequences of all processes should be determined by functions and internal logic of the processes; therefore, an implementation process of the embodiments of the present invention is not limited thereto.

It should be further understood that the wavelength selective switch according to this embodiment of the present invention may correspond to the wavelength selective switch 100 in the foregoing embodiment of the present invention, and the foregoing and other operations and/or functions of the modules in the wavelength selective switch 100 may be shown in FIG. 1 to FIG. 5. For the purpose of conciseness, details are not described herein again.

Therefore, in the method for controlling a spatial phase modulator in a wavelength selective switch in this embodiment of the present invention, the spatial phase modulator is controlled, so that the first light beam included in the single-wavelength optical signal is incident on the output port of the wavelength selective switch, and the second light beam included in the single-wavelength optical signal is incident on the monitoring port of the wavelength selective switch. In this way, performance monitoring can be performed on a single-wavelength optical signal without adding an additional tunable optical filter or wavelength demultiplexing component, and therefore, a system volume can be reduced, the complexity of a system structure can be decreased, and system costs can be significantly reduced.

In this embodiment of the present invention, optionally, the first spatial phase sub-modulator, configured to control the first single-wavelength optical signal, of the spatial phase modulator includes a first pixel array and a second pixel array, the first pixel array is used to control the first light beam to be incident on the output port, and the second pixel array is used to control the second light beam to be incident on the monitoring port.

In this embodiment of the present invention, optionally, the first spatial phase sub-modulator, configured to control the first single-wavelength optical signal, of the spatial phase modulator forms the holographic diffraction grating, and the first spatial phase sub-modulator is configured to control the first light beam to be transmitted along a prime order direction of the holographic diffraction grating, and control the second light beam to be transmitted along a non-prime order direction of the holographic diffraction grating.

In this embodiment of the present invention, optionally, strength of the first light beam is greater than strength of the second light beam.

In this embodiment of the present invention, optionally, the spatial phase modulator is further configured to separately split, in different time dimensions, each single-wavelength optical signal included in at least two single-wavelength optical signals in the multiple single-wavelength optical signals into two light beams, where one light beam in the two light beams of each single-wavelength optical signal included in the at least two single-wavelength optical signals is incident on a same monitoring port of the wavelength selective switch at a different time point.

In this embodiment of the present invention, optionally, the spatial phase modulator is further configured to separately split, in different space dimensions, each single-wavelength optical signal included in at least two single-wavelength optical signals in the multiple single-wavelength optical signals into two light beams, where one light beam in the two light beams of each single-wavelength optical signal included in the at least two single-wavelength optical signals is separately incident on one of at least two monitoring ports of the wavelength selective switch that are located at different locations.

In this embodiment of the present invention, optionally, the wavelength selective switch further includes at least one component of the following components: a first collimator, a first light beam deforming component, and a first polarization conversion component, where the multi-wavelength optical signal is incident on the first demultiplexing/multiplexing component after passing through at least one component of the first collimator, the first light beam deforming component, and the first polarization conversion component.

In this embodiment of the present invention, optionally, the wavelength selective switch further includes a second demultiplexing/multiplexing component, and the multiple single-wavelength optical signals whose transmission directions are changed by the spatial phase modulator are incident on at least one of the output port and the monitoring port of the wavelength selective switch after passing through the second demultiplexing/multiplexing component.

In this embodiment of the present invention, optionally, the wavelength selective switch further includes at least one component of the following components: a second collimator, a second light beam deforming component, and a second polarization conversion component, where the multiple single-wavelength optical signals are incident on at least one of the output port and the monitoring port of the wavelength selective switch after passing through at least one component of the second collimator, the second light beam deforming component, and the second polarization conversion component.

In this embodiment of the present invention, optionally, the wavelength selective switch further includes at least one component of the following components: an input-side focusing lens and an output-side focusing lens, where the multiple single-wavelength optical signals are incident on the spatial phase modulator after passing through the input-side focusing lens, or multiple single-wavelength optical signals output by the spatial phase modulator are output after being converged by the output-side focusing lens.

In this embodiment of the present invention, optionally, the spatial phase modulator is a liquid crystal on silicon LCOS.

Therefore, in the method for controlling a spatial phase modulator in a wavelength selective switch in this embodiment of the present invention, a spatial phase modulator is controlled, so that a first light beam included in a single-wavelength optical signal is incident on an output port of a wavelength selective switch, and a second light beam included in the single-wavelength optical signal is incident on a monitoring port of the wavelength selective switch. In this way, performance monitoring can be performed on a single-wavelength optical signal without adding an additional tunable optical filter or wavelength demultiplexing component, and therefore, a system volume can be reduced, the complexity of a system structure can be decreased, and system costs can be significantly reduced.

In addition, the terms "system" and "network" in this specification are often used interchangeably in this specification. The term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

Figure 8:
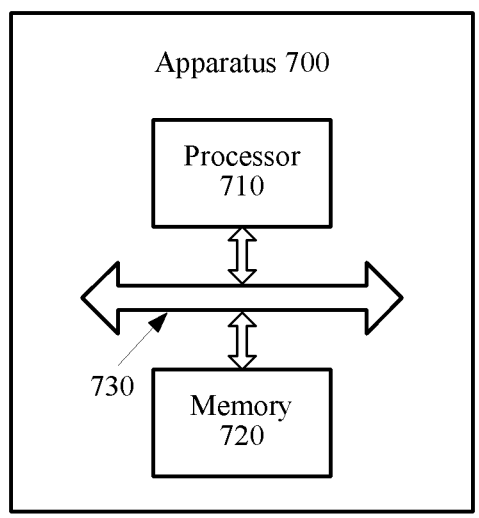
FIG. 8 is a schematic block diagram of an apparatus for controlling a spatial phase modulator in a wavelength selective switch according to an embodiment of the present invention.

As shown in FIG. 8, an embodiment of the present invention further provides an apparatus 700 for controlling a spatial phase modulator in a wavelength selective switch. The apparatus 700 includes a processor 710, a memory 720, and a bus system 730. The processor 710 and the memory 720 are connected to each other by using the bus system 730, the memory 720 is configured to store an instruction, and the processor 710 is configured to execute the instruction stored by the memory 720. The processor 710 is configured to: determine a first pixel array and a second pixel array of a spatial phase modulator that are used to control a first single-wavelength optical signal; control the first pixel array so that a first light beam included in the first single-wavelength optical signal is incident on an output port of a wavelength selective switch; and control the second pixel array so that a second light beam included in the first single-wavelength optical signal is incident on a monitoring port of the wavelength selective switch.

The wavelength selective switch includes: a first demultiplexing/multiplexing component, configured to split a multi-wavelength optical signal into multiple single-wavelength optical signals in space, where the multi-wavelength optical signal is input from an input port of the wavelength selective switch; a spatial phase modulator, configured to separately change a transmission direction of each single-wavelength optical signal included in the multiple single-wavelength optical signals, where the spatial phase modulator is further configured to split a first single-wavelength optical signal in the multiple single-wavelength optical signals into a first light beam and a second light beam, where the first light beam is incident on an output port of the wavelength selective switch, and the second light beam is incident on a monitoring port of the wavelength selective switch; a photoelectric detector, disposed at the monitoring port and configured to receive the second light beam; and a performance monitoring component, configured to perform performance monitoring on the second light beam received by the photoelectric detector.

It should be understood that in this embodiment of the present invention, the processor 710 may be a central processing unit (Central Processing Unit, "CPU" for short), and the processor 710 may further be another general-purpose processor, a digital signal processor (DSP), an application-specific integrated circuit (ASIC), a field-programmable gate array (FPGA) or another programmable logical component, a discrete gate or transistor logical component, a discrete hardware component, or the like. The general-purpose processor may be a micro-processor, or the processor may also be any conventional processor or the like.

The memory 720 may include a read-only memory and a random access memory, and provides an instruction and data to the processor 710. A part of the memory 720 may further include a non-volatile random access memory. For example, the memory 720 may further store information about a component type.

The bus system 730 may further include a power bus, a control bus, a status signal bus, and the like in addition to a data bus. However, for the purpose of clear description, all types of buses are marked as the bus system 730 in the figure.

In an implementation process, steps in the foregoing method may be implemented by means of a hardware integrated logical circuit in the processor 710, or an instruction in the form of software. The steps in the methods disclosed with reference to the embodiments of the present invention may be directly implemented by a hardware processor, or may be implemented by a combination of hardware and software modules in a processor. The software module may be located in a mature storage medium in the art, such as a random access memory, a flash memory, a read-only memory, a programmable read-only memory, an electrically erasable programmable memory, or a register. The storage medium is located in the memory 720, and the processor 710 reads information in the memory 720 and performs the steps of the foregoing methods in combination with hardware of the processor 430. Details are not described herein again to avoid repetition.

It should be further understood that the foregoing and other operations and/or functions in the modules in the apparatus 700 for controlling a spatial phase modulator in a wavelength selective switch according to this embodiment of the present invention are used to implement corresponding procedures of the method in FIG. 6, and are not described herein again for the purpose of conciseness.

It should be further understood that the wavelength selective switch controlled by the apparatus 700 according to this embodiment of the present invention may correspond to the wavelength selective switch 100 in the foregoing embodiment of the present invention, and the foregoing and other operations and/or functions of the modules in the wavelength selective switch 100 may be shown in FIG. 1 to FIG. 5. For the purpose of conciseness, details are not described herein again.

Therefore, in the apparatus for controlling a spatial phase modulator in a wavelength selective switch in this embodiment of the present invention, a spatial phase modulator is controlled, so that a first light beam included in a single-wavelength optical signal is incident on an output port of a wavelength selective switch, and a second light beam included in the single-wavelength optical signal is incident on a monitoring port of the wavelength selective switch. In this way, performance monitoring can be performed on a single-wavelength optical signal without adding an additional tunable optical filter or wavelength demultiplexing component, and therefore, a system volume can be reduced, the complexity of a system structure can be decreased, and system costs can be significantly reduced.

Figure 9:
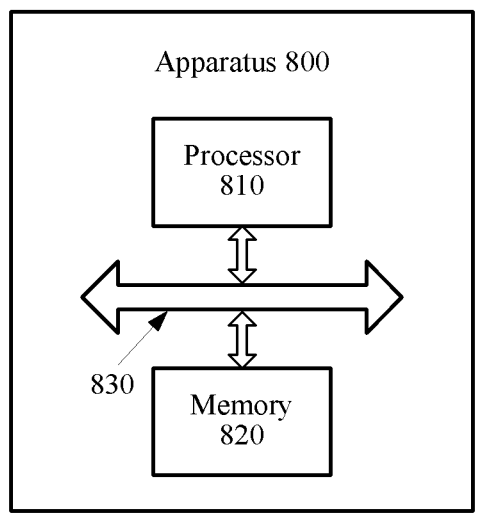
FIG. 9 is another schematic block diagram of an apparatus for controlling a spatial phase modulator in a wavelength selective switch according to an embodiment of the present invention.

As shown in FIG. 9, an embodiment of the present invention further provides an apparatus 800 for controlling a spatial phase modulator in a wavelength selective switch. The apparatus 800 includes a processor 810, a memory 820, and a system bus 830. The processor 810 and the memory 820 are connected to each other by using the bus system 830, the memory 820 is configured to store an instruction, and the processor 810 is configured to execute the instruction stored by the memory 820. The processor 810 is configured to: determine a first spatial phase sub-modulator, configured to control a first single-wavelength optical signal, of a spatial phase modulator; control the first spatial phase sub-modulator so that a first light beam included in the first single-wavelength optical signal is transmitted along a prime order direction of a holographic diffraction grating formed by the first spatial phase sub-modulator; and control the first spatial phase sub-modulator so that a second light beam included in the first single-wavelength optical signal is transmitted along a non-prime order direction of the holographic diffraction grating.

It should be understood that in this embodiment of the present invention, the processor 810 may be a central processing unit (Central Processing Unit, "CPU" for short), and the processor 810 may further be another general-purpose processor, a digital signal processor (DSP), an application-specific integrated circuit (ASIC), a field-programmable gate array (FPGA) or another programmable logical component, a discrete gate or transistor logical component, a discrete hardware component, or the like. The general-purpose processor may be a micro-processor, or the processor may also be any conventional processor or the like.

The memory 820 may include a read-only memory and a random access memory, and provides an instruction and data to the processor 810. A part of the memory 820 may further include a non-volatile random access memory. For example, the memory 820 may further store information about a component type.

The bus system 830 may further include a power bus, a control bus, a status signal bus, and the like in addition to a data bus. However, for the purpose of clear description, all types of buses are marked as the bus system 830 in the figure.

In an implementation process, steps in the foregoing method may be implemented by means of a hardware integrated logical circuit in the processor 810, or an instruction in the form of software. The steps in the methods disclosed with reference to the embodiments of the present invention may be directly implemented by a hardware processor, or may be implemented by a combination of hardware and software modules in a processor. The software module may be located in a mature storage medium in the art, such as a random access memory, a flash memory, a read-only memory, a programmable read-only memory, an electrically erasable programmable memory, or a register. The storage medium is located in the memory 820, and the processor 810 reads information in the memory 820 and performs the steps of the foregoing methods in combination with hardware of the processor 430. Details are not described herein again to avoid repetition.

It should be further understood that the foregoing and other operations and/or functions in the modules in the apparatus 800 for controlling a spatial phase modulator in a wavelength selective switch according to this embodiment of the present invention are used to implement corresponding procedures of the method in FIG. 7, and are not described herein again for the purpose of conciseness.

It should be further understood that the wavelength selective switch controlled by the apparatus 800 according to this embodiment of the present invention may correspond to the wavelength selective switch 100 in the foregoing embodiment of the present invention, and the foregoing and other operations and/or functions of the modules in the wavelength selective switch 100 may be shown in FIG. 1 to FIG. 5. For the purpose of conciseness, details are not described herein again.

Therefore, in the apparatus for controlling a spatial phase modulator in a wavelength selective switch in this embodiment of the present invention, a spatial phase modulator is controlled, so that a first light beam included in a single-wavelength optical signal is incident on an output port of a wavelength selective switch, and a second light beam included in the single-wavelength optical signal is incident on a monitoring port of the wavelength selective switch. In this way, performance monitoring can be performed on a single-wavelength optical signal without adding an additional tunable optical filter or wavelength demultiplexing component, and therefore, a system volume can be reduced, the complexity of a system structure can be decreased, and system costs can be significantly reduced.

A person of ordinary skill in the art may be aware that, in combination with the examples described in the embodiments disclosed in this specification, units and algorithm steps may be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. A part or all of the units may be selected according to actual needs to achieve the objectives of the solutions of the embodiments of the present invention.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present invention essentially, or the part contributing to the prior art, or all or a part of the technical solutions may be implemented in the form of a software product. The software product is stored in a storage medium and includes several instructions for instructing a computer component (which may be a personal computer, a server, or a network component) to perform all or a part of the steps of the methods described in the embodiments of the present invention. The foregoing storage medium includes: any medium that can store program code, such as a USB flash drive, a removable hard disk, a read-only memory (ROM, Read-Only Memory), a random access memory (RAM, Random Access Memory), a magnetic disk, or an optical disc.

The foregoing descriptions are merely specific embodiments of the present invention, but are not intended to limit the protection scope of the present invention. Any modification or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A wavelength selective switch, comprising:
a first demultiplexing/multiplexing component, configured to split a multi-wavelength optical signal into multiple single-wavelength optical signals in space, wherein the multi-wavelength optical signal is input from an input port of the wavelength selective switch;
a spatial phase modulator, configured to separately change a transmission direction of each single-wavelength optical signal comprised in the multiple single-wavelength optical signals, wherein the spatial phase modulator is further configured to split a first single-wavelength optical signal in the multiple single-wavelength optical signals into a first light beam and a second light beam, wherein the first light beam is incident on an output port of the wavelength selective switch, and the second light beam is incident on a monitoring port of the wavelength selective switch;
a photoelectric detector, disposed at the monitoring port and configured to receive the second light beam; and
a performance monitoring component, configured to perform performance monitoring on the second light beam received by the photoelectric detector.

2. The wavelength selective switch according to claim 1, wherein a first spatial phase sub-modulator, configured to control the first single-wavelength optical signal, of the spatial phase modulator comprises a first pixel array and a second pixel array, the first pixel array is used to control the first light beam to be incident on the output port, and the second pixel array is used to control the second light beam to be incident on the monitoring port.

3. The wavelength selective switch according to claim 1, wherein a first spatial phase sub-modulator, configured to control the first single-wavelength optical signal, of the spatial phase modulator forms a holographic diffraction grating, and the first spatial phase sub-modulator is configured to control the first light beam to be transmitted along a prime order direction of the holographic diffraction grating, and control the second light beam to be transmitted along a non-prime order direction of the holographic diffraction grating.

4. The wavelength selective switch according to claim 1, wherein strength of the first light beam is greater than strength of the second light beam.

5. The wavelength selective switch according to claim 1, wherein the spatial phase modulator is further configured to separately split, in different time dimensions, each single-wavelength optical signal comprised in at least two single-wavelength optical signals in the multiple single-wavelength optical signals into two light beams, wherein one light beam in the two light beams of each single-wavelength optical signal comprised in the at least two single-wavelength optical signals is incident on a same monitoring port of the wavelength selective switch at a different time point.

6. The wavelength selective switch according to claim 1, wherein the spatial phase modulator is further configured to separately split, in different space dimensions, each single-wavelength optical signal comprised in at least two single-wavelength optical signals in the multiple single-wavelength optical signals into two light beams, wherein one light beam in the two light beams of each single-wavelength optical signal comprised in the at least two single-wavelength optical signals is separately incident on one of at least two monitoring ports of the wavelength selective switch that are located at different locations.

7. The wavelength selective switch according to claim 1, wherein the wavelength selective switch further comprises at least one component of the following components: a first collimator, a first light beam deforming component, and a first polarization conversion component, wherein the multi-wavelength optical signal is incident on the first demultiplexing/multiplexing component after passing through at least one component of the first collimator, the first light beam deforming component, and the first polarization conversion component.

8. The wavelength selective switch according to claim 1, wherein the wavelength selective switch further comprises a second demultiplexing/multiplexing component, and the multiple single-wavelength optical signals whose transmission directions are changed by the spatial phase modulator are incident on at least one of the output port and the monitoring port of the wavelength selective switch after passing through the second demultiplexing/multiplexing component.

9. The wavelength selective switch according to claim 1, wherein the wavelength selective switch further comprises at least one component of the following components: a second collimator, a second light beam deforming component, and a second polarization conversion component, wherein the multiple single-wavelength optical signals are incident on at least one of the output port and the monitoring port of the wavelength selective switch after passing through at least one component of the second collimator, the second light beam deforming component, and the second polarization conversion component.

10. The wavelength selective switch according to claim 1, wherein the wavelength selective switch further comprises at least one component of the following components: an input-side focusing lens and an output-side focusing lens, wherein the multiple single-wavelength optical signals are incident on the spatial phase modulator after passing through the input-side focusing lens, or multiple single-wavelength optical signals output by the spatial phase modulator are output after being converged by the output-side focusing lens.

11. The wavelength selective switch according to claim 1, wherein the spatial phase modulator is a liquid crystal on silicon LCOS.

12. A method for controlling a spatial phase modulator in a wavelength selective switch, the method comprises:
  splitting a multi-wavelength optical signal into multiple single-wavelength optical signals in space, wherein the multi-wavelength optical signal is input from an input port of the wavelength selective switch;
  separately changing a transmission direction of each single-wavelength optical signal comprised in the multiple single-wavelength optical signals;
  splitting a first single-wavelength optical signal in the multiple single-wavelength optical signals into a first light beam and a second light beam, wherein the first light beam is incident on an output port of the wavelength selective switch by controlling the spatial phase modulator, and the second light beam is incident on a monitoring port of the wavelength selective switch by controlling the spatial phase modulator;
  performing performance monitoring on the second light beam.

13. The method of claim 12, wherein the spatial phase modulator comprises a first pixel array and a second pixel array, the first light bean being incident on the output port of the wavelength selective switch is achieved by controlling the first pixel array, the second light beam being incident on the monitoring port of the wavelength selective switch is achieved by controlling the second pixel array.

* * * * *